(12) United States Patent
De Vorchik et al.

(10) Patent No.: US 6,279,016 B1
(45) Date of Patent: *Aug. 21, 2001

(54) STANDARDIZED FILTERING CONTROL TECHNIQUES

(75) Inventors: David De Vorchik; Oshoma Momoh, both of Seattle; Timothy Allen Satalich, Redmond; Richard S. Turner, Jr., Woodinville; Lauren Beth Gallagher, Seattle, all of WA (US); Wayne G. Scott, Austin, TX (US)

(73) Assignee: Microsoft Corporation, Redmond, WA (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/938,032

(22) Filed: Sep. 21, 1997

(51) Int. Cl.⁷ .................................................. G06F 17/30
(52) U.S. Cl. .............................. 707/526; 707/102; 707/4; 345/326
(58) Field of Search ................................... 707/526, 500, 707/516, 102, 100, 3, 4, 10, 503; 345/339, 333, 326, 968

(56) References Cited

U.S. PATENT DOCUMENTS

| | | | |
|---|---|---|---|
| 4,653,020 | * 3/1987 | Cheselka et al. | 364/900 |
| 5,563,595 | 10/1996 | Strohacker | 341/106 |
| 5,630,122 | 5/1997 | Kaplan et al. | 707/4 |
| 5,632,022 | * 5/1997 | Warren et al. | 345/968 |
| 5,636,350 | * 6/1997 | Eick et al. | 345/440 |
| 5,652,878 | 7/1997 | Craft | 707/1 |
| 5,680,563 | * 10/1997 | Edelman | 345/348 |

(List continued on next page.)

FOREIGN PATENT DOCUMENTS 462 363 A2    12/1991 (EP) .

OTHER PUBLICATIONS

King, *Inside Windows 95*, Microsoft Press, 1994, Chapter 5, pp. 157–221.

Maran et al., "Filtering Records in a List," *Teach Yourself Microsoft Excel 97 Visually*, IDG Books Worldwide, pp. 256–259 (1998).

Dodge et al., Chapter 25, "Managing Information in Lists," *Microsoft Excel 97*, Microsoft Press, pp. 853–892 (1997).

Dodge et al., Chapter 26, "Working With External Data," *Microsoft Excel 97*, Microsoft Press, pp. 893–931 (1997).

Primary Examiner—John Breene
Assistant Examiner—Greta L. Robinson
(74) Attorney, Agent, or Firm—Klarquist Sparkman Campbell Leigh & Whinston, LLP

(57) ABSTRACT

A standard user interface enables a user to filter an arbitrary unfamiliar data set intuitively and effectively. The illustrated interface includes a header control presenting labels, filters, and pulldown menus for each attribute of a data set, presented by an associated display control. The control communicates with a data provider through a set of APIs included in the computer's operating system. Through these APIs the data provider indicates the labels and menus to be displayed, while the header control passes new filter criteria to the data provider as it is specified by the user. The data provider filters the data set according to the user-specified filter criteria, and returns the filtered data set for display by the display control. Desirably, new filter criteria are passed to the data provider as they are being typed by the user, allowing the data provider to return successively smaller sets of result data, thus giving the visual impression of a shrinking data set. Non-textual filtering criteria can be input using non-textual interfaces, specified by the data providers. The illustrated control is data-agnostic, allowing its standardized use across a wide variety of data types and data providers.

53 Claims, 11 Drawing Sheets

U.S. PATENT DOCUMENTS

| | | | |
|---|---|---|---|
| 5,694,546 | * | 12/1997 | Reisman .................................. 705/26 |
| 5,710,899 | * | 1/1998 | Eick ...................................... 395/339 |
| 5,758,083 | * | 5/1998 | Singh et al. .................... 395/200.53 |
| 5,787,411 | * | 7/1998 | Groff et al. .............................. 707/2 |
| 5,809,483 | * | 9/1998 | Broka et al. ........................... 705/37 |
| 5,809,497 | * | 9/1998 | Freund et al. ............................ 707/2 |
| 5,815,703 | * | 9/1998 | Copeland et al. .................... 707/102 |
| 5,826,076 | * | 10/1998 | Bradley et al. ...................... 395/703 |
| 5,845,300 | | 12/1998 | Comer et al. ........................ 707/508 |
| 5,982,369 | * | 11/1999 | Sciammarella et al. ............. 345/349 |

* cited by examiner

FIG. 4

| NAME ▽ | TYPE ▽ | PATH | ▽ | DATE ▽ |
|---|---|---|---|---|
| Doc 1 | MS Word | C:\... | | 1/1/97 |
| Doc 2 | MS Excel | C:\... | | 2/3/94 |
| Doc 3 | MS Works | C:\... | | 5/13/93 |
| Doc 4 | Text | C:\... | | 12/30/95 |
| Doc 5 | Text | C:\... | | 5/11/97 |
| Doc 6 | MS Word | C:\... | | 4/19/97 |
| Doc 7 | MS Works | C:\... | | 10/20/94 |
| Doc 8 | MS Word | C:\... | | 8/12/96 |

360 { rows } 370

| NAME ▽ | TYPE ▼ | PATH | ▽ | DATE ▽ |
|---|---|---|---|---|
| | Starts with | | | |
| Doc 1 | Ends with | C:\... | | 1/1/97 |
| Doc 2 | Is (exactly) | C:\... 382 | | 2/3/94 |
| Doc 3 | Is not | C:\... | | 5/13/93 |
| Doc 4 | Text | C:\... | | 12/30/95 |
| Doc 5 | Text | C:\... | | 5/11/97 |
| Doc 6 | MS Word | C:\... | | 4/19/97 |
| Doc 7 | MS Works | C:\... | | 10/20/94 |
| Doc 8 | MS Word | C:\... | | 8/12/96 |

FIG. 6

| NAME | TYPE | PATH | DATE |
|---|---|---|---|
| | MS | | |
| Doc 1 | MS Word | C:\... | 1/1/97 |
| Doc 2 | MS Excel | C:\... | 2/3/94 |
| Doc 3 | MS Works | C:\... | 5/13/93 |
| Doc 6 | MS Word | C:\... | 4/19/97 |
| Doc 7 | MS Works | C:\... | 10/20/94 |
| Doc 8 | MS Word | C:\... | 8/12/96 |

| NAME | TYPE | PATH | DATE |
|---|---|---|---|
| | Word | | |
| Doc 1 | MS Word | C:\... | 1/1/97 |
| Doc 6 | MS Word | C:\... | 4/19/97 |
| Doc 8 | MS Word | C:\... | 8/12/96 |

FIG. 8

| NAME ▼ | TYPE ▼ | PATH | ▼ | DATE ▼ |
|---|---|---|---|---|
| | MS | | | "97" |
| Doc 1 | MS Word | C:\... | | 1/1/97 |
| Doc 6 | MS Word | C:\... | | 4/19/97 |

FIG. 9A

| NAME ▼ | TYPE ▼ | PATH | ▼ | DATE ▼ |
|---|---|---|---|---|
| | MS Wor | | | |
| Doc 1 | MS Word | C:\... | | 1/1/97 |
| Doc 3 | MS Works | C:\... | | 5/13/93 |
| Doc 6 | MS Word | C:\... | | 4/19/97 |
| Doc 7 | MS Works | C:\... | | 10/20/94 |
| Doc 8 | MS Word | C:\... | | 8/12/96 |

FIG. 9B

| NAME ▽ | TYPE ▽ | PATH | ▽ | DATE ▽ |
|---|---|---|---|---|
|  | MS Works |  |  |  |
| Doc 3 | MS Works | C:\... |  | 5/13/93 |
| Doc 7 | MS Works | C:\... |  | 10/20/94 |

FIG. 10

| AGENCY ▽ | COLOR ▼ | MODEL ▽ | PRICE ▽ |
|---|---|---|---|
| | | 390 | |
| Landmark | | 1998 F250, OptionPak 4 | $19,543 |
| Keller Bros | | 1998 Tacoma XL | $21,995 |
| Vancouver | | 1998 Seneca GXS | $24,500 |
| Thompson's | Is close to | 1997 Ram Turbo | $28,000 |
| MidState | Is not | 1998 Blazer, Bauer pack | $23,499 |
| Exoticars | Flamingo | 1998 Dakota XLR | $16,777 |
| Kuni | Mint | Suburban | $31,712 |
| Bellevue | August Red | Grand Cherokee | $28,425 |

FIG. 11

| NAME ▽ | TYPE ▼ | PATH | DATE ▽ |
|---|---|---|---|
| | MS Word | | |
| Doc 1 | MS Excel | C:\... | 1/1/97 |
| Doc 2 | MS Works | C:\... | 2/3/94 |
| Doc 3 | Text | C:\... | 5/13/93 |
| Doc 4 | Text | C:\... | 12/30/95 |
| Doc 5 | Text | C:\... | 5/11/97 |
| Doc 6 | MS Word | C:\... | 4/19/97 |
| Doc 7 | MS Works | C:\... | 10/20/94 |
| Doc 8 | MS Word | C:\... | 8/12/96 |

STANDARDIZED FILTERING CONTROL TECHNIQUES

FIELD OF THE INVENTION

The present invention relates to techniques for posing queries to data providers, and for returning results in a standardized form.

BACKGROUND

Computer users frequently encounter an overwhelming amount of information when trying to use a computer. A data provider such as an Internet search engine may return thousands of "hits" in response to a simple query. A data provider for an email archive may show hundreds of messages which must be scrolled through to find a single one. A computer file directory tree may list tens of thousands of documents in confusing layers. FIG. 1A shows a computer system with a different interface 200, 202, 204, 206, 208 for each data provider 210, 212, 214, 216, 218.

To compound the difficulty of accessing this volume of information, data providers do not use a standard user interface. Instead of learning one versatile user interface, a user must become proficient in multiple user interfaces, a time-consuming and frustrating task.

The lack of a standard user interface creates extra work for software developers, who must design a different interface for each data provider. For example, in a windowed environment, a software developer must design a new control with different tabs, buttons, and overall configuration in order to satisfy the requirements of each data provider.

Existing user interfaces allow filtering of data sets based on multiple attributes at one time. But it is not always apparent from looking at a user interface how this is to be accomplished. For example, a user interface might support precision filtering using multiple attributes of a data set only if the user possesses advance knowledge of the data set's attributes or query language. No standard user interface allows precise filtering of a data set on multiple attributes in an intuitive fashion.

A user interface can issue even more precise queries on a data set by supporting multiple comparison modes for each query term. For example, the AutoFilter feature of Microsoft Excel 97 supports multiple comparison modes for a query term. AutoFilter allows the user to specify how the query term is to be compared to the data set. One drawback of the AutoFilter implementation is that the user specifies the comparison mode in a dialog box apart from the main user interface.

Iterative related queries are frequently issued by users attempting to successively filter enormous quantities of data down to manageable amounts. For example, a user who issues a simple query to an Internet search engine may receive thousands of "hits" in response. The user may then issue a narrower query to find a subset within these responses. The narrower query is typically the original query+another term.

Enormous redundancy results when the modified query is executed on the entire data set rather than the narrower set returned in response to the first query. A lesser redundancy results when the complete set of query terms rather than just the changes to the query terms are passed between the user interface and the data provider. These redundancies lead to a lack of appealing visual feedback in a user interface and cause slow response time in filtering a data set.

Rather than showing a data set "shrinking" as further criteria are input, most existing user interfaces send a query only after the user has explicitly indicated that formulation of the query is completed. For example, a user types a query and then presses <Enter> to send the query. The disadvantage of this method is that the visual impact of seeing the data set shrink, as input is entered, is lost.

Accordingly, some existing user interfaces filter after each keystroke of textual input is entered. For example, many Applications have Help Indexes which are traversed as each keystroke is entered. If the user needs help with the "display," the user types "d" and the index jumps to "d." When the user types "i," the index jumps to "di," etc. The disadvantage of this method is that a filtering system sometimes gets bogged down if filtering large data sets; responsiveness and visual performance suffer.

A further disadvantage of existing user interfaces is that they do not enable non-textual filtering of data sets. Instead, data sets are sorted according to arbitrary patterns of text or exact values of text, even if the user is searching for a color, icon, bitmap, or sound in a data set.

The preferred embodiment of the present invention overcomes the shortcomings of the prior art by providing a standard user interface through which a user can effectively and intuitively interact with an unfamiliar data provider.

SUMMARY OF THE INVENTION

The preferred embodiment of the present invention is directed to a header control which enables a user to filter an unfamiliar data set intuitively and effectively. The header control and its containing standard user interface simplifies tasks for users and software developers. Users no longer need to become proficient in a multitude of user interfaces. Software developers no longer need to design a new user interface for each data provider. Instead, software developers can supply a minimum of information about the data provider and data set to the standard user interface.

In the described embodiment, the standard user interface is presented as a "QuickFilter" header control in a windowed environment. The standard user interface includes a label, filter, and pulldown menu button for each attribute of a data set displayed by a corresponding columnar "listview" control. The pulldown menu button can be actuated to display a menu of items associated with an attribute of the data set. The control communicates with a data provider through a set of Application Programming Interfaces (APIs) included in the computer's operating system.

Through these APIs, the data provider sends the header control data sets and pulldown menu information, which is then displayed in the header control as part of the standard user interface. The header control notifies the data provider of any changes to the filters of the control. The header control also notifies the data provider of any selections made using the pulldown menu information supplied by the data provider.

The data provider filters the data set according to the filter change and selection information received from the header control. Each data provider determines how to filter a data set given the information received from the header control. Once the data set is filtered, the data provider sends it back to the listview control, where it is displayed.

The header control is designed for intuitive and easy use. It enables precise, intuitive queries by positioning a label and a filter for each of the attributes of a data set above that displayed attribute of the data set. As the filters are changed by the user, the data set is filtered by the data provider and redisplayed in the listview control, creating the visual effect of the data set shrinking as filter input is received.

The header control accomplishes this visual "shrinking" effect by sending filter change notifications without explicit signaling from the user to do so. To prevent the filter requests from becoming backlogged and ruining the advantageous shrinking effect, a filter timer—set by the data provider—determines how often filter requests are sent. If the filtering and redisplay of a data set can be done quickly, the data set might be filtered after each keystroke of input. On the other hand, if the filtering and redisplay of a data set take longer, the filter timer may be set for a longer duration to balance the responsiveness of the display against performance degradation caused by reconstructing the set too frequently.

In the described embodiment, the pulldown menus display information about comparison modes by which a filter for an attribute may be compared to the data set. Displaying this information in a pulldown menu near the attribute for which the information is relevant provides another intuitive aspect of the standard user interface.

In an alternate embodiment, the pulldown menus display custom controls (or launch a second window displaying custom controls) supplied by the data provider. Custom controls enable the user to enter non-textual filter input used to filter a data set with non-textual attributes. For example, a custom control may be a color palette on which a user selects a color then used to filter a data set by color. The foregoing and additional features of the present invention will be more readily apparent from the following detailed description, which proceeds with reference to the accompanying drawings.

DESCRIPTION OF THE DRAWINGS

FIG. 4 is an illustration of the window control of FIG. 3 displaying a data set made up of rows of data objects described in columns of attributes.

FIG. 5 is an illustration of the window control of FIG. 4 with a pulldown menu button actuated and a pulldown menu displayed after retrieval of comparison mode information from a data provider.

FIG. 6 is an illustration of the window control of FIG. 4 after the data set has been filtered by Type "MS," Comparison Mode "Starts with."

FIG. 7 is an illustration of the window control of FIG. 4 after the data set has been filtered by Type "Word," Comparison Mode "Ends with."

FIG. 8 is an illustration of the window control of FIG. 4 after the data set has been filtered by Type "MS," Comparison Mode "Starts with," and Date "97," Comparison Mode "Year."

FIG. 9A is an illustration of the window control of FIG. 4 after the data set has been filtered by Type "MS Wor," Comparison Mode "Starts with," where the filtering process was initiated when the filter timer expired.

FIG. 9B is an illustration of the window control of FIG. 9A after the data set has been filtered by Type "MS Work," Comparison Mode "Starts with," where the filtering process was initiated when the user pressed <Enter>.

FIG. 10 is an illustration of a window control showing a data set composed of homes and a custom control menu which displays an area for filter input and an area for comparison mode input.

FIG. 11 is an illustration of the window control of FIG. 4 showing a unique value list menu which displays each of the unique values of the column above which it is located and which is used to obtain filter input.

DETAILED DESCRIPTION

The invention is illustrated with reference to a method and apparatus for providing a standard user interface (SUI) to an arbitrary data provider. Through the use of the SUI, a user can submit a precise query to an unfamiliar data provider and receive a timely response. The timeliness of the response varies to maximize the efficiency of the query and the visual impact of continuously displaying intermediate updated results of a query. In the illustrated embodiment, standardization of the SUI is accomplished by the adoption of a set of Application Programming Interfaces (APIs) by the SUI and the data providers.

Operating Environment for the Present Invention

Figure 2:
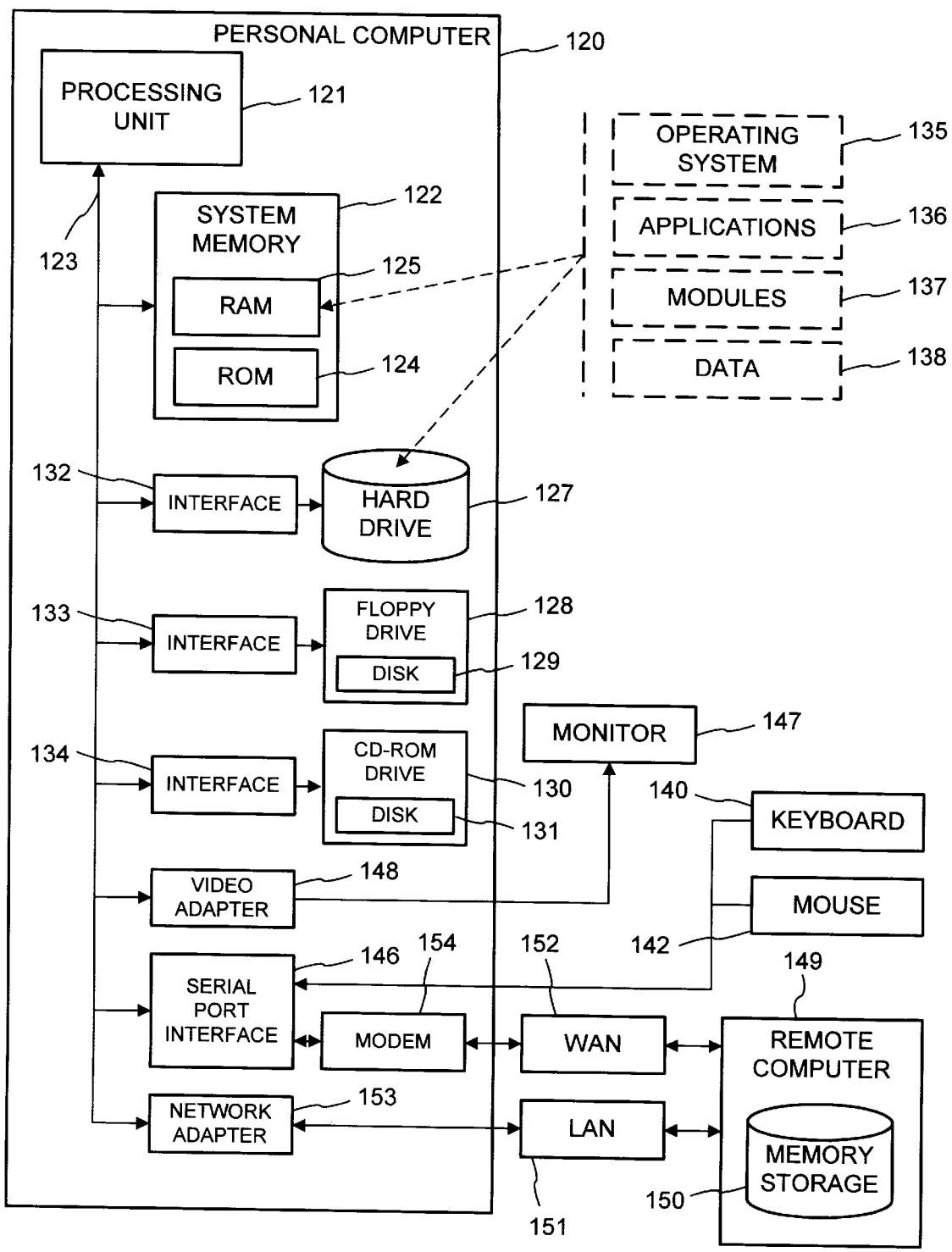
FIG. 2 is a diagram illustrating a computer system that serves as an operating environment for an implementation of the invention.

FIG. 2 and the following discussion are intended to provide a brief, general description of a suitable computing environment in which the invention may be implemented.

While the invention is described in the general context of computer-executable instructions of a computer program that runs on a personal computer, those skilled in the art will recognize that the invention also may be implemented in combination with other program modules.

Generally, program modules include routines, programs, components, data structures, etc. that perform particular tasks or implement particular abstract data types.

Moreover, those skilled in the art will appreciate that the invention may be practiced with other computer system configurations, including hand-held devices, multiprocessor systems, microprocessor-based or programmable consumer electronics, minicomputers, mainframe computers, and the like. The invention may also be practiced in distributed computing environments where tasks are performed by remote processing devices that are linked through a communications network. In a distributed computing environment, program modules may be located in both local and remote memory storage devices.

FIG. 2 illustrates an example of a computer system that serves as an operating environment for the invention. The computer system includes a personal computer 120, having a processing unit 121, a system memory 122, and a system bus 123 that interconnects various system components including the system memory to the processing unit 121. The system bus may comprise any of several types of bus structures including a memory bus or memory controller, a peripheral bus, or a local bus using a bus architecture such as PCI, VESA, Microchannel (MCA), ISA and EISA, to name a few.

The system memory includes read only memory (ROM) 124 and random access memory (RAM) 125. A basic input/output system (BIOS), containing the basic routines that help to transfer information between elements within the personal computer 120, such as during start-up, is stored in ROM 124.

The personal computer 120 further includes a hard disk drive 127, a magnetic disk drive 128, e.g., to read from or write to a removable disk 129, and an optical disk drive 130, e.g., for reading a CD-ROM disk 131 or to read from or write to optical media. The hard disk drive 127, magnetic disk drive 128, and optical disk drive 130 are connected to the system bus 123 by a hard disk drive interface 132, a magnetic disk drive interface 133, and an optical drive interface 134, respectively. The drives and their associated computer-readable media provide nonvolatile storage of data, data structures, computer-executable instructions (program code such as dynamic link libraries, and executable files), etc. for the personal computer 120.

Although the description of computer-readable media above refers to a hard disk, a removable magnetic disk and a CD, it can also include other types of media that are readable by a computer, such as magnetic cassettes, flash memory cards, digital video disks, Bernoulli cartridges, and the like.

A number of program modules may be stored in the drives and RAM 125, including an operating system 135 (e.g. Windows NT, Windows 95, MS-DOS, etc.), one or more application programs 136, other program modules 137, and program data 138.

A user may enter commands and information into the personal computer 120 through a keyboard 140 and pointing device, such as a mouse 142. Other input devices (not shown) may include a microphone, joystick, game pad, satellite dish, scanner, or the like. These and other input devices are often connected to the processing unit 121 through a serial port interface 146 that is coupled to the system bus, but may be connected by other interfaces, such as a parallel port, game port or a universal serial bus (USB).

A monitor 147 or other type of display device is also connected to the system bus 123 via an interface, such as a video adapter 148. In addition to the monitor, personal computers typically include other peripheral output devices (not shown), such as speakers and printers.

Figure 1A:
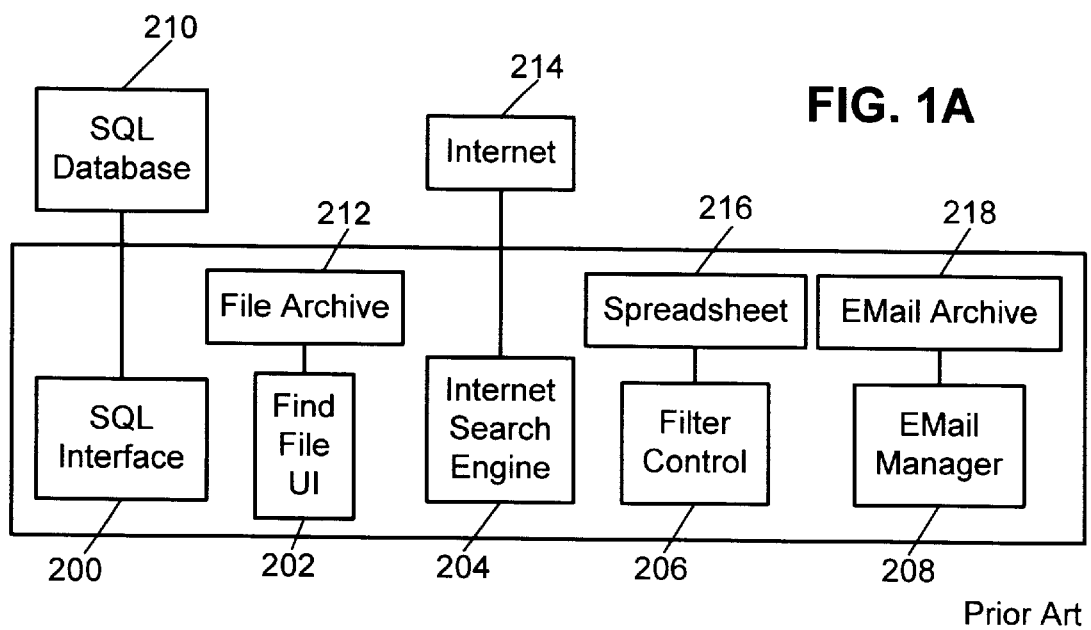
FIG. 1A is a diagram of a computer system with existing user interfaces to access different databases.

The personal computer 120 may operate in a networked environment using logical connections to one or more remote computers, such as a remote computer 149. The remote computer 149 may be a server, a router, a peer device or other common network node, and typically includes many or all of the elements described relative to the personal computer 120, although only a memory storage device 150 has been illustrated in FIG. 1. The logical connections depicted in FIG. 1 include a local area network (LAN) 151 and a wide area network (WAN) 152. Such networking environments are commonplace in offices, enterprise-wide computer networks, intranets and the Internet.

When used in a LAN networking environment, the personal computer 120 is connected to the local network 151 through a network interface or adapter 153. When used in a WAN networking environment, the personal computer 120 typically includes a modem 54 or other means for establishing communications over the wide area network 152, such as the Internet. The modem 154, which may be internal or external, is connected to the system bus 123 via the serial port interface 146.

In a networked environment, program modules depicted relative to the personal computer 120, or portions thereof, may be stored in the remote memory storage device. It will be appreciated that the network connections shown are exemplary and that other means of establishing a communications link between the computers may be used.

The Header Control and Standard User Interface

Figure 12:
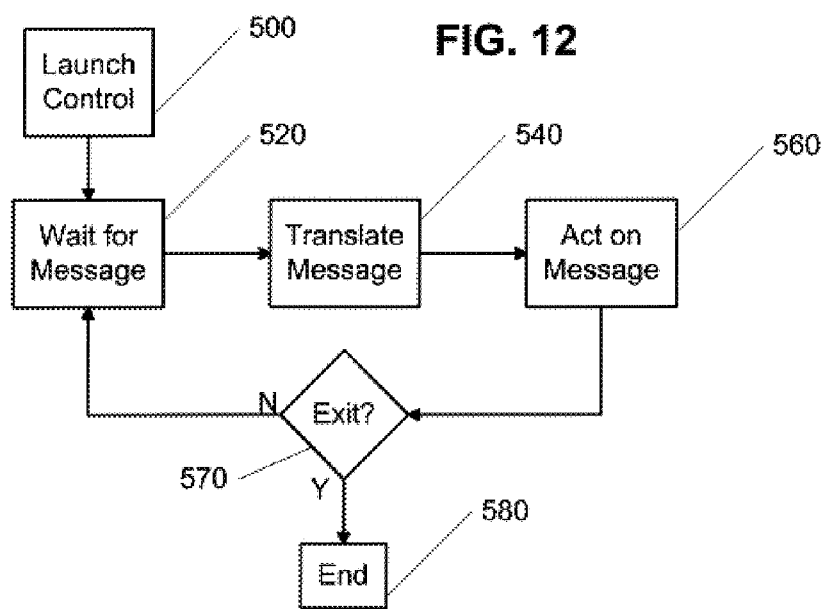
FIG. 12 is a flowchart showing a method according to one embodiment of the present invention.
Figure 13:
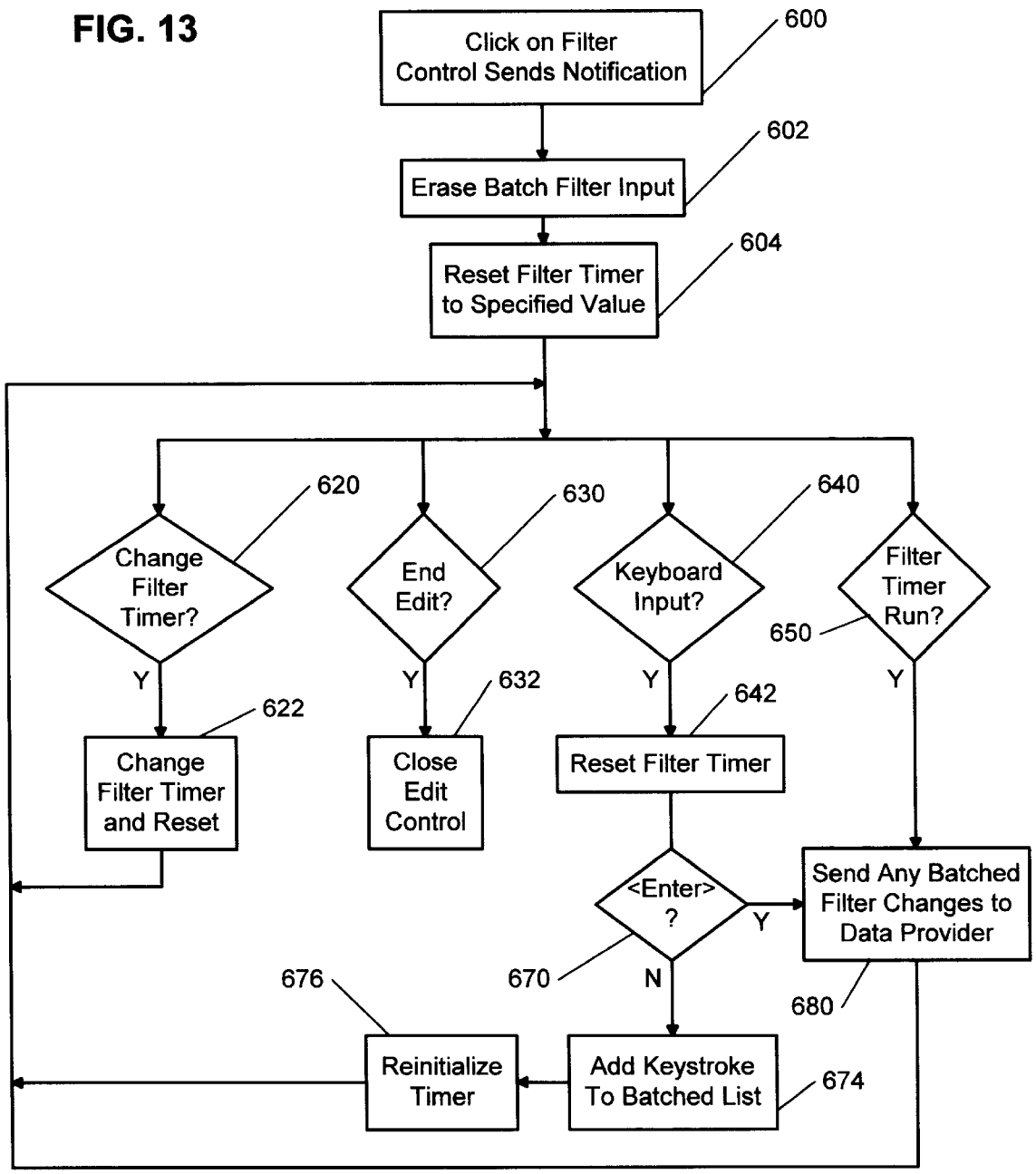
FIG. 13 is a flowchart showing the responses taken by the header control in different circumstances.

FIGS. 1B and 3–13 illustrate the functionality of the header control and listview control that comprise the Standard User Interface (SUI) of an embodiment of the present invention. FIGS. 1B and 3–8 show the workings of the header control and SUI as a whole, while FIGS. 9A and 9B shows how the filter timer for textual filter input works within the SUI. FIGS. 10 and 11 show alternate embodiments of the present invention using custom control menus and unique value lists, respectively. FIGS. 12 and 13 are flow-charts more generally describing operation of the illustrated system.

Figure 1B:
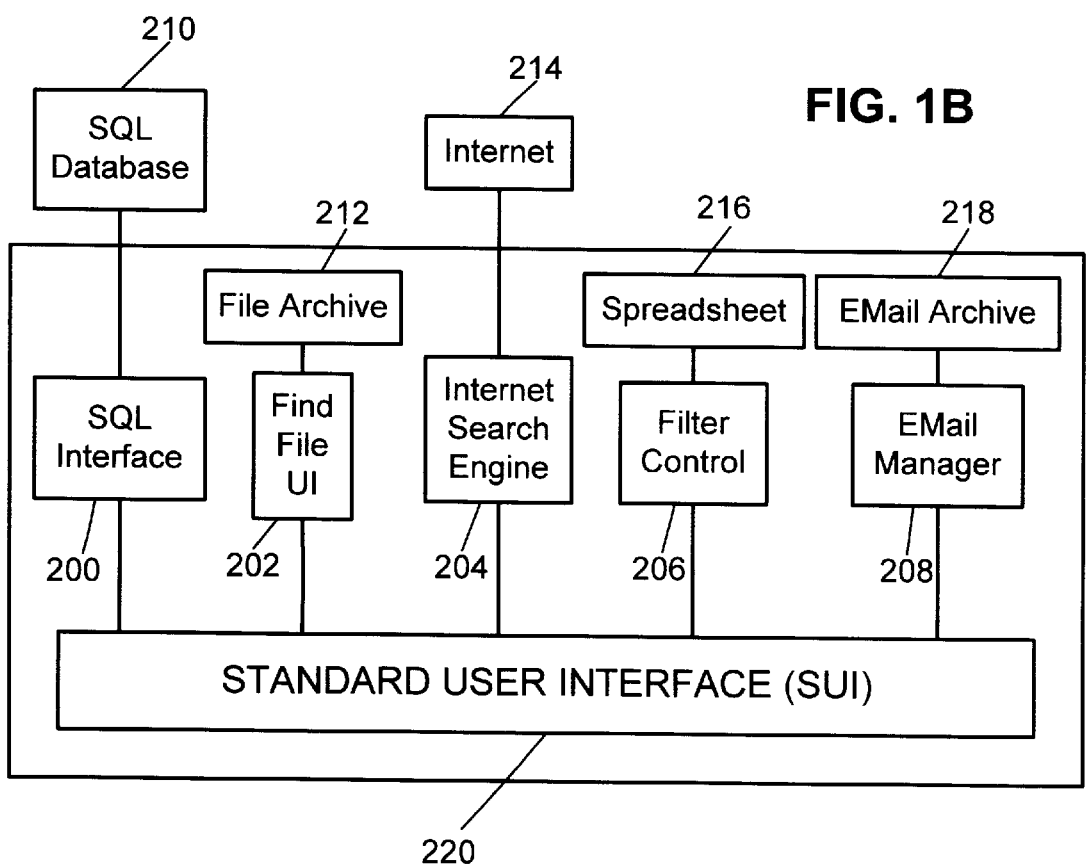
FIG. 1B is a diagram of a computer system with a user interface according to one embodiment of the present invention to access different databases.

FIG. 1B shows an illustrative SUI according to the present invention. In contrast to the multiple UIs needed to access multiple data providers 210, 212, 214, 216, 218 according to the methods of the prior art, the present invention provides a single SUI 220 to access multiple data providers.

The illustrated SUI 220 can access any data provider designed according to the APIs detailed below. For example, the SUI can be used to access a file directory tree 212 through a file manager 202 employing the below-discussed APIs. The same SUI can be used to access spreadsheets 216, the Internet 214, or email archives 218.

SUI 220 offers advantages for users of computer systems and for software designers. Users no longer need to learn different query languages or remember how to manipulate different interfaces in order to access different data providers. Software developers no longer need to design data provider-specific user interfaces. Instead, software developers can rely on the features of the SUI.

Figure 3:
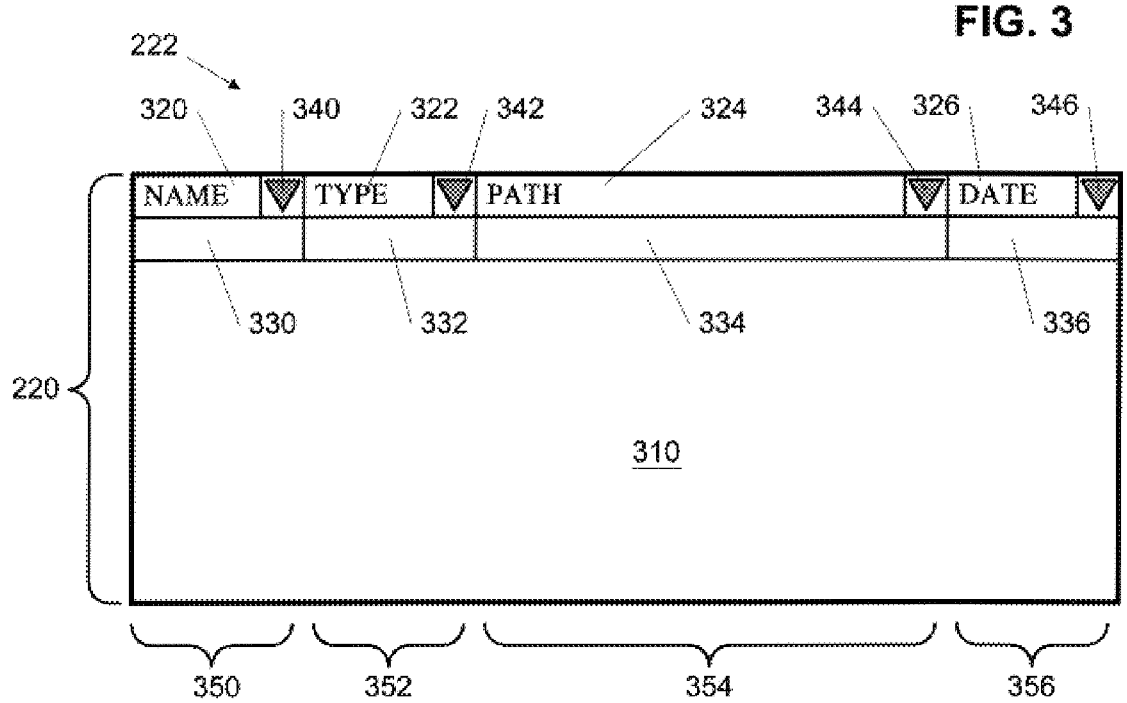
FIG. 3 is an illustration of a window control containing (1) a listview control with a space for a data set, and (2) a header control with labels for the data set attributes, pulldown menu buttons, and filters for the attributes.

FIG. 3 shows a control 222 containing SUI 220 after the control is launched by the user. The SUI illustrated in FIG. 3 is part of a standalone control. In an alternate embodiment, the SUI is part of another query control.

The control 222 includes an area 310 for the display of a data set (including columns 350, 352, 354, 356 for attributes), labels 320, 322, 324, 326 for the attributes of the data set, filters 330, 332, 334, 336 for the attributes of the data set, and pulldown menu buttons 340, 342, 344, 346 next to the labels of the attributes. The number of attributes and labels of the attributes are known when the control is launched. In an alternate embodiment, the number of attributes and labels for the attributes are gleaned from the data set displayed in the control. In any case, the number of columns and the labels for the attributes vary depending on the data set.

In the illustrated embodiment, the header control is launched independently of the listview control. This means that the header control may become visible before a data set is displayed, as shown in FIG. 3. In an alternate embodiment, the data set is displayed within the listview control as soon as the header control is launched. The data provider supplies the data set as well as the information contained in the pulldown menus which are activated by pressing the pulldown menu buttons on the header control.

As will be recognized by those skilled in the art, the precise configuration of the data set area, labels, filters, and pulldown menu buttons can be modified as desired.

FIG. 4 shows the control of FIG. 3 displaying a data set. The data set includes rows 360 of data objects and columns 370 of attributes describing those data objects. Though the data set illustrated in FIG. 4 is composed of application documents described by name, type, path, and date, any other data set can be used. For example, data sets can include World-Wide-Web pages registering hits according to an Internet search engine, email messages stored in an email archive, or data records in a spreadsheet. The data set is supplied by the data provider. The illustrated listview control can accommodate a data set with an arbitrary number of data objects or data attributes. The illustrated header control can similarly accommodate an arbitrary number of data attributes.

As will be recognized by those skilled in the art, the precise organization of the data set can be altered without changing the functionality of the illustrated embodiment. For example, the rows of the data set could be attributes while the columns could represent data objects.

FIG. 5 shows the SUI of FIG. 4 with a pulldown menu button 342 pressed and a pulldown menu 382 displayed by the header control. The pulldown menu 382 displays the comparison modes by which the filter 332 (FIG. 3) of the attribute of column 352 should be applied to the data set. For example, the pulldown menu for the "Type" attribute is displayed. By selecting a comparison mode, a user can check whether any member of the data set has a Type which "Starts with," "Ends with," "Is (exactly)," or "Is not" the term input into the filter 332 for the attribute.

The data provider supplies the comparison mode information displayed in the pulldown menu. This information can be different for each attribute. In FIG. 5, the user has selected the comparison mode "Starts with" with a cursor 390 of a pointing device. (As will be recognized by those skilled in the art, other input devices can be used to select a comparison mode without changing the functionality of the illustrated embodiment.) If the user does not select a comparison mode for an attribute, the data provider uses a default comparison mode when executing a query.

FIG. 6 illustrates the SUI of FIG. 4 after the user has entered input into the header control's Type filter 332. The user has activated the Type filter by clicking on the filter using a pointing device. Prompted by the click on the filter, the filter switched to edit mode. The user has typed in "MS" and pressed <ENTER> to send a data change to the data provider. Alternately, the user could click elsewhere on the SUI with the pointing device to exit edit mode.

When the user exits edit mode, the filter change is sent by the header control to the data provider. The data provider filters the data set according to the Type filter term "MS" and the comparison mode "Starts with," which could have been selected by the user or could have been the default comparison mode. The filtered data set has been returned by the data provider and displayed in the listview control.

Although a data provider determines how to execute a query using filter and comparison mode input, normally a data provider ignores filters that have never been changed by a user. In other words, by default, filters are blank (or otherwise shown as inactive) and not used in filtering.

As will be recognized by those skilled in the art, different methods of activating and exiting the filters for the purposes of editing can be used without changing the functionality of the illustrated embodiment.

FIG. 7 illustrates the SUI of FIG. 4 after the user has selected Type comparison mode "Ends with" and Type filter "Word." The data provider has filtered the data set according to the filter and mode information passed to it. The filtered data set has been returned by the data provider and displayed in the listview control.

FIG. 8 illustrates the SUI of FIG. 4 after the user has selected Type comparison mode "Starts with," Type filter "MS," Date comparison mode "Year," and Date filter "97" within the header control. The control displays the data set and the header control displays the filters after the data provider has filtered the data set using all of this information.

The data provider determines how to apply the filters and mode selections to the data set. In FIG. 8, the data provider filtered data objects starting with "MS" AND having year "97." Alternatively, a data provider could have filtered data objects starting with "MS" OR having year "97. " A data provider can use the filter terms and mode selections in any filtering algorithm. The filtering process is invisible to the header control and listview control of the illustrated embodiment. The header control sends filter changes and mode selections to the data provider (or its interface program) and the listview control receives filtered data sets in return.

Although FIG. 8 shows the data set after filtering according to all of the terms of the query, as noted above, filter changes are sent to the data provider when the user exits edit mode for a particular filter. Comparison mode selections are sent to the data provider when made. When the data provider receives a filter change or comparison mode selection, the data provider filters the data set according to the most recent terms of the query. For the query of FIG. 8, the data provider would have executed multiple filtering operations before the filtering operation resulting in the data set of FIG. 8.

The Timer on Textual Filter Changes

FIGS. 9A and 9B shows the SUI of FIG. 4 working with a timer on textual filter changes. When the user edits a filter, the timer measures the time elapsed since the user last entered keyboard input. As keyboard input is received, it is batched by the header control until sent to the data provider as a filter change. The head control automatically sends the batched input when the user exits edit mode for the filter. In addition, if the time elapsed since keyboard input was last received (or time elapsed since a query was last sent to the data provider) is above a certain limit, the batched keyboard input is sent to the data provider.

Referring to FIG. 9A, suppose a user of the illustrated embodiment is a novice typist and the timer is set for 2 seconds. The user wants to filter the data set of FIG. 4 according to Type "MS Works." The user types "MS Wor," but before the user can find "k" on the keyboard, the timer expires and the filter change Type "MS Wor" is sent to the data provider. The data set filtered according to Type "MS Wor" and Comparison Mode "Starts with" (default) is returned and displayed.

Referring to FIG. 9B, suppose the user then finds the "k" and types "ks<ENTER>." The <ENTER> causes the user to exit edit mode, automatically sending the filter change Type 'ks' to be sent to the data provider immediately without waiting for the timer to expire. The data set filtered according to Type "MS Works" and Comparison Mode "Starts with" (default) is returned and displayed.

The timer in the illustrated embodiment is reset after each keystroke of input is received. If the timer is set for 3 seconds, a pause of less than 3 seconds between keystrokes causes the keystrokes to be batched into a single filter change and the timer to be reset after each keystroke. A pause of 3 or more seconds after the last keystroke is received causes the batched keyboard input to be sent as a filter change.

In the illustrated embodiment of the invention, the timer is set by the data provider and can be changed. If the data provider sets the timer with a very short duration, the data provider filters after each keystroke is input. In such a case, if the data provider's filtering operation takes longer than the typing of keystrokes, the data provider may become bogged down in filter requests, causing slow visual responses in the redisplay of data sets and causing a slow response when the user explicitly initiates a filter operation by exiting edit mode.

On the other hand, when the timer is set with a long duration, the SUI loses the advantageous visual impact of "shrinking" a data set as the user types in keystrokes.

Accordingly, the data provider sets the timer to balance the responsiveness of the SUI against the performance degradation caused by reconstructing the data set too frequently. If the data provider becomes more busy or less busy, the optimal time may change. For example, if the data provider is an Internet search engine, the time will be longer at peak hours for Internet use and shorter at off hours for Internet use.

As will be recognized by those skilled in the art, if it was possible to predetermine an optimal time for the data provider, the timer could be set by the header control when launched without changing the functionality of the illustrated embodiment.

The Custom Control Menu

FIG. 10 illustrates an alternate embodiment of the control and SUI of the illustrated embodiment. In this embodiment, when the user actuates the pulldown menu button 342, a custom control menu 402 is displayed. The data provider supplies the custom control 412 displayed in the pulldown menu. In an alternate embodiment, the data provider signals to the control which one of plural custom controls 412 to display in the pulldown menu. (The color picker control 412 in FIG. 10 is necessarily grey due to patent reproduction limitations. In actual practice, the color picker presents a 2D spectrum of color choices.)

The user interacts with the custom control 412 to input (e.g. with the cursor 390 of a pointing device) non-textual query terms for the attribute 352 with which the custom control is associated. These non-textual query terms are used as text filters are used to filter a data set.

For example, suppose the data set being searched is cars stocked by local car dealers, as detailed on a page on the World Wide Web. One attribute of each car is color. A potential car buyer with a limited color vocabulary (white, off-white, greenish-gray, etc.) would be at a disadvantage using a textual search for a car of a desired color. To overcome the user's inability to describe the full range of car colors in textual terms, and to enable a more intuitive filter, the illustrated embodiment allows for a custom control 412 in the form of a color palette for car colors. Presented with this color palette, the user selects a color with the pointing device. The selection is passed like a filter change to the data provider. The data provider then filters the data set using the color selection as a filter.

The custom control menu displays comparison mode information supplied by the data provider in a pulldown menu 382 alongside the custom control menu 402. For example, if the custom control 412 is a color palette, the comparison modes "Is close to" and "Is not" might be displayed. In an alternate embodiment, the custom control menu contains the custom control, while comparison mode information is presented in a separate menu.

In yet another alternative embodiment, the custom control may take the form of a secondary window, launched by activation of a filter's pull-down menu, or by selection of a 'Custom . . . ' entry on the pulldown menu.

Figure 14:
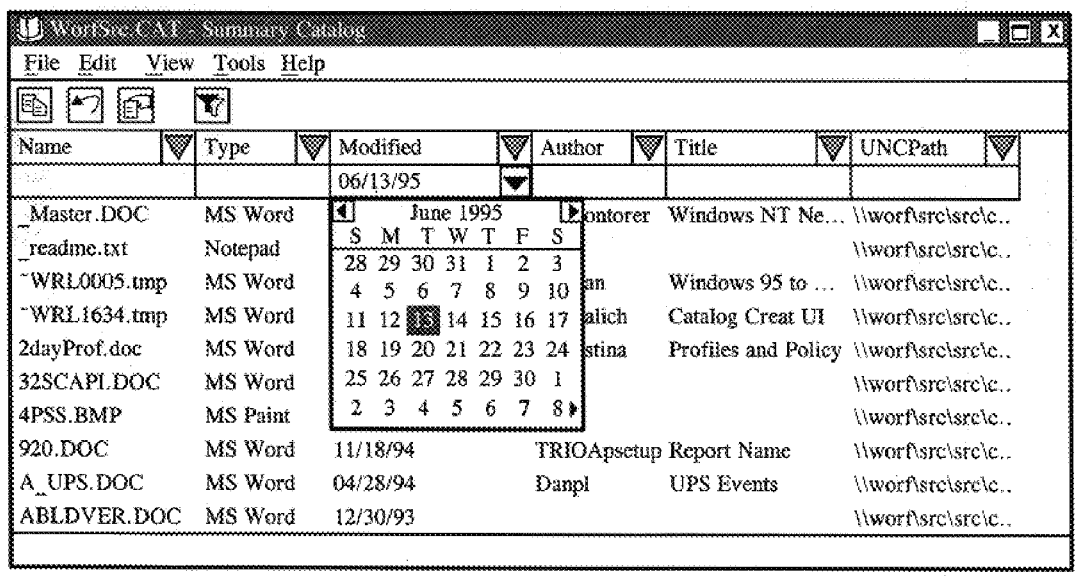
FIG. 14 is an illustration of a window control that has launched a secondary "calendar" window when the "Modified" pulldown menu is activated.
Figure 15:
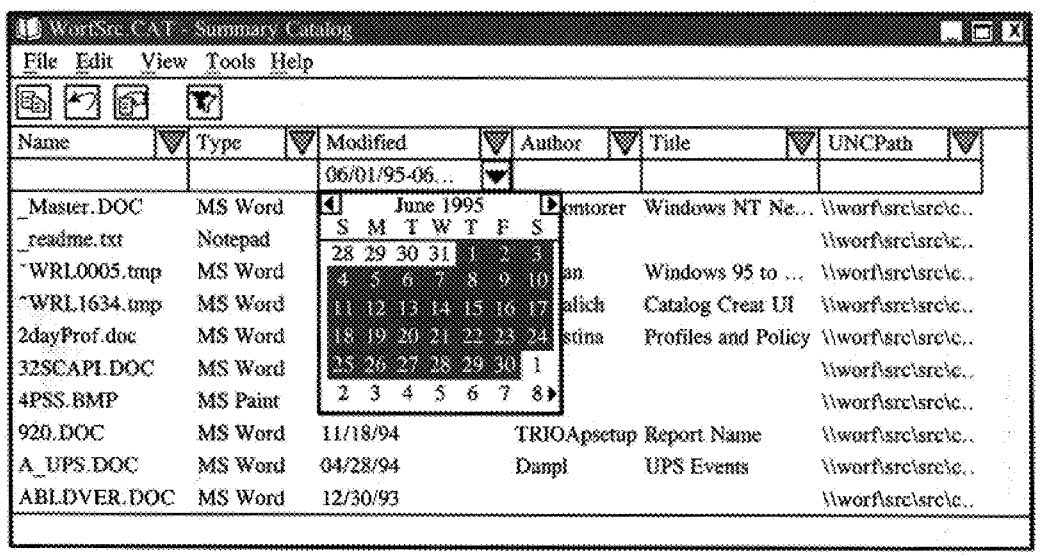
FIG. 15 is like FIG. 14, but shows selection of a range of dates in the secondary "calendar" window.

FIG. 14 shows such an arrangement, in which a secondary "calendar" window is launched when the user activates the "Modified" pulldown menu. The user can click on a single date in the calendar or, as shown in FIG. 15, may drag the cursor control device across a range of dates in the calendar window. In the former case, a single date is entered in the "Modified" filter field; in the latter, a range of dates is entered.

Figure 16:
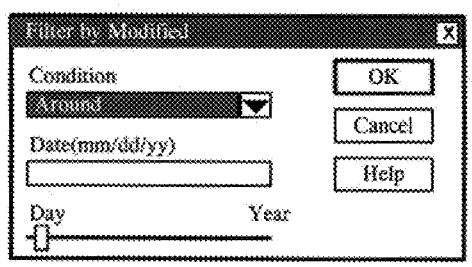
FIG. 16 shows another secondary window that may be launched by activation of the "Modified" pulldown menu—this one permitting selection of a "Modified" attribute around a specified date.

FIG. 16 shows another example of a secondary window that may be launched when a user activates the "Modified" pulldown menu button. In this example, the secondary window allows the user to pick one of several conditions, e.g. On, Between, or Around. If the user selects Around, a slider control activates that allows entry of the range of time around the specified date that will meet the filter criteria.

Returning to the custom color selector, if color data is stored in the data provider in quantitative form (e.g. RGB, YUV, etc.), then the "is close to" condition may be satisfied by colors whose corresponding color components are all numerically within, e.g., 15% of the color components of the color selected by the user. (In a variant embodiment, different percentage ranges may be used for different color components when judging "closeness," in accordance with the human eye's differing sensitivity to differing colors.)

Although not shown in FIG. 10, other color relationships that may be specified include "lighter than" and "darker than." These can be adjudged, e.g., by converting the user-picked color to a corresponding grey-scale value, and comparing that value with corresponding grey-scale values of the colors stored in the data provider.

The Unique Value List

FIG. 11 illustrates an alternate embodiment of the header control and SUI of FIG. 4. In this embodiment, when the user actuates the pulldown menu button 342, a unique value list menu 422 is displayed. The unique value list enumerates the unique values of the attribute with which the unique value list is associated. For example, the unique value list of FIG. 11 displays "MS Word," "MS Excel," "MS Works," and "Text,"—an exhaustive list of all the data types of stored in the data provider.

The unique value list displayed in a pulldown menu is used by the user to select a value with the pointing device. This selection is passed as a filter change to the data provider, which then uses the unique value selection to filter the data set.

The data provider supplies the unique value list. Before initializing the contents of the pulldown menu, the data provider scans the current data set and determines the unique values present for a given attribute of the data set. The unique values are passed back much as comparison modes are passed back.

As noted earlier, if filters are set for several attributes, the data provider ANDs these together when performing the query. The unique value list allows a powerful extension of this basic protocol: if the user selects several different values in a single attribute unique value list (e.g. by holding the Control key while selecting multiple values), then these are ORed together when querying the data provider. This arrangement has been found, in usability testing, to provide a highly intuitive interface.

Narrowing Searches

As noted, iterative related queries are frequently issued by users attempting to successively filter large quantities of data down to manageable amounts. For example, a user who issues a simple query to an Internet search engine may receive thousands of "hits" in response. The user may then issue a narrower query to find a subset within these responses. The narrower query is typically the original query+(or "AND") another term.

Tremendous redundancy results when the modified query is executed on the entire data set rather than the narrower set returned in response to the first query. This redundancy impairs visual feedback in a user interface and slows response time.

In the illustrated embodiment, the handling of narrowed filters is left to the specific data provider being queried. When a second query, further limiting the results of an immediately preceding query, is presented, some data providers may execute the search anew. Other, more intelligent data providers, may maintain and refme the results of the prior search, rather than starting anew.

Queries as Objects

In many situations, it is advantageous to pass a query to another user instead of passing just the query results. (The latter may soon be outdated, and may be voluminous as well.) In the illustrated embodiment, a user can pass a QuickFilter control to another user, e.g. by email. That other user can then execute the passed query when and as desired.

Cursored Scrolling

Sometimes the filter criteria may be set so broadly that hundreds of data objects in the data provider (or more) qualify for display. In one embodiment, all data objects that meet the filter criteria are passed to the listview control for display, regardless of their number. In another embodiment, a limited number of objects (e.g. twice as many as can be displayed in the window) are passed. This allows for some scrolling through a window, without burdening the system with extensive data transfers. If the user tries to scroll past the last entry in the window, the data provider can be instructed to be provided additional objects for display by the listview control.

Sort Order

In the illustrated embodiment, sorting of the objects displayed in the SUI is effected by the data provider, which provides the objects to the listview control in a sorted order. In other embodiments, sorting can be effected on the SUI side.

The Header Control and Application Programming Interfaces

As indicated, the header control communicates with the data provider and the parent of the control by means of a set of APIs. Generally, the APIs work through the exchange of messages and notifications. The header control sends notifications to the parent of the control and to the data provider through the parent. The header control receives messages from the parent and from the data provider through the parent.

FIG. 12 is a high level flowchart of the header control of the illustrated embodiment. As illustrated in FIG. 12, the header control is launched 500 by the user. At this point the control frame, labels, filters, and pulldown menu buttons are displayed. The data set may be displayed at this time or not, depending on whether the listview control is also initialized. The header control can be launched as a standalone control or as part of a larger query window. Either way, the header control has a parent through which it sends and receives messages. If launched in Microsoft Windows, the Win32 CreateWindow API is used.

If the header control is created according to the standards of Microsoft's QuickFilter, the control is described in messages to the control and notifications from the control as a NM_QUICKFILTER or QF_FILTER structure.

QF_FILTER

This structure is passed as part of the messages from the data provider involving individual filters. The message allows the parent to set or retrieve the current filter values for a particular column.

The field dwType indicates which of the filter values are valid based on the FILTER_TYPE_* values. If dwType is FILTER_TYPE_INT then the iFilter field is valid. When dwType is FILTER_TYPE_STRING, it is assumed that pszFilter points to a suitable buffer from which to set the filter data or into which to return the filter data. When setting the filter the cchFilter defines the maximum edit size of the filter, and when returning the filter it defines the buffer size pointed to by pszFilter.

```
#define FILTER_TYPE_STRING    0x01
#define FILTER_TYPE_INT       0x03
typedef struct
{
    DWORD dwFlags;                // reserved (should be zero)
    DWORD dwType;                 one of the FILTER_TYPE_<bla> values
    union
    {
        INT iFilter;              // valid if dwType == FILTER_TYPE_INT
        struct
        {
            LPSTR pszFilter;      // valid if dwType == FILTER_TYPE_STRING
            INT cchFilter;        // valid if dwType == FILTER_TYPE_STRING
        };
    };
} QF_FILTER, * LPQFFILTER;
```

NM_QUICKFILTER

When communicating back to the parent of the header control by a WM_NOTIFY notification, a NM_QUICKFILTER structure indicates which column is the subject of the notification. All notifications from the QuickFilter control have this header.

The NMHDR field is a standard part of any notify message. iColumn indicates which column within the header is the subject of the notification.

```
typedef struct
{
    NMHDR   hdr;
    INT     iColumn;
} NM_QUICKFILTER;
```

Once launched, the header control waits (520, FIG. 12) to receive messages. When the control receives a message, it translates (540) the message in order to determine how to act in response to the message.

After translating a message, the header control acts (560) on the message before returning to the state of waiting (520) for the next message. An action taken by a control can be closing the control (570), moving or resizing the control, rearranging the appearance of the control, or sending a notification to the parent of the control or data provider through the parent.

Many messages are standard messages for manipulating a header control and are not specifically directed to the control of the illustrated embodiment. For example, if implemented in a windowed environment, the control of the illustrated embodiment receives Win32 HDM_ messages from the parent that tell it to rearrange the columns of the control. The control also receives other standard Win32 messages from the parent that tell it to move or resize the control.

The header control receives HDM messages from the data provider through the parent which provide the data set displayed as part of the standard user interface. The header control further receives HMENU messages from the data provider through the parent which provide the information displayed in the pulldown menus.

In addition to these standard messages, the header control receives other messages which are specific to the control of the illustrated embodiment. These messages are described in the following section.

API Messages and Notifications

The illustrated header control responds to messages directing it to set a filter, get a filter, show/hide all filters, set the parent to which notifications are sent, and set the duration of the filter timer.

If the header control is designed according to the standards of Microsoft's QuickFilter, the messages directing the control to do the above actions are implemented as follows.

QFM_SETFILTER

The parent sends this message to set the filter value for a particular column. wParam contains the column to set the filter on, which is assumed to have been previously added to the QuickFilter control by HDM_SETITEM. lParam contains a pointer to a QF_FILTER structure.

If the filter is an integer filter (FILTER_TYPE_INT) the value is simply stored in memory. When the edit control is created to allow the user to modify the value, the corresponding style bits are set to allow the user to only enter digits.

If the filter is a string filter (FILTER_TYPE_STRING) a copy of the string pointed to be pszFilter is made. When the string value is edited, the cchFilter is used to limit the number of characters the user can type.

The call returns TRUE if successfully.

QFM_GETFILTER

The parent sends this message to get the filter value for a particular column. wParam contains the column to get the filter from. lParam contains a pointer to a QF_FILTER structure.

The structure is filled to contain the current filter contents and type. It is assumed that the data provider knows the type of the filter for a particular column and that the QF_FILTER structure contains a valid buffer pointer and size.

If the filter is FILTER_TYPE_INT, the integer value is simply stored into the structure. If the filter is FILTER_TYPE_STRING, the string is copied to the buffer supplied by the data provider if that buffer is large enough. Otherwise, the call fails.

The call returns TRUE if successful.

QFM_SHOWFILTER

By default the filter bar for the control is visible. This message allows the caller to show or hide it based on the value in wParam. If wParam is non-zero then the filter bar is shown, otherwise it remains hidden.

The call returns the previous visible state of the filter bar.

QFM_SETNOTIFYTARGET

When using the QuickFilter header control to replace the standard header control in a list view, notifications are sent to the ListView by default, as it is the parent of the control. QuickFilter can specify that instead, notifications will be sent to the window described in HWND of lparam.

The call returns TRUE if successful.

QFM_SETCHANGETIMEOUT

When editing a filter, the QuickFilter control batches up the edits and sends a single notification (QFN_CHANGE) after a specified timeout. This message allows a data provider to change that timeout from its default, which is twice the double click time out. lParam contains the time in milliseconds to set the filter timer.

The call returns TRUE if successful.

The illustrated headercontrol also sends notifications telling the data provider that a filter has been changed, requesting that the data provider return a pulldown menu, telling the data provider that an operator was chosen, and telling the parent that a filter has started or finished being edited.

If the header control is designed according to the standards of Microsoft QuickFilter, these notifications are implemented as follows.

QFN_CHANGE

The QFN_CHANGE notification notifies the parent of the header control that one of the filters has changed. A NM_QUICKFILTER structure is passed as a parameter and contains information about both the control and the column that was modified.

QFN_CHANGE notifications are sent after the filter timer has expired, after the user presses <ENTER> within the edit control, or after the user selects a comparison mode from the pulldown menu.

The value returned by this notification is ignored.

QFN_GETOPERATORMENU

The QFN_GETOPERATORMENU notification is sent when the filter wants to display the comparison operator menu for a particular column. A NM_QUICKFILTER structure is passed as a parameter and contains information about both the control and the column for the display. The parent, upon receipt of this message should return a HMENU which will be displayed. If the return value is NULL then the call ignores the operator menu for that column. The return value from this notification is either a HMENU or NULL.

QFN_OPERATORCHOSEN

After the comparison operator menu has been displayed and the user has made a selection, the QuickFilter control sends this notification to the parent to inform them of the change.

The value returned by this notify message is ignored.

This notification passes, as a parameter, a structure NM_QFOPERATORCHOSEN. Having sent a QFN_GETOPERATORMENU notification, the filter control calls TrackPopupMenu on it to display the result. The return code from that TrackPopUpMenu is passed to the parent using as NM_QFOPERATORCHOSEN.

NM_QFOPERATORCHOSEN consists of a NM_QUICKFILTER header and a wID field containing the result of TrackPopupMenu assuming it was non-zero.

```
typedef struct
{
    NM_QUICKFILTER nmqf;
    WORD           wID;
} NM_QFOPERATORCHOSEN;
```

QFN_BEGINFILTEREDIT
QFN_ENDFILTEREDIT

These two notifications are used to inform the parent when a filter is being edited. A NM_QUICKFILTER structure is passed as a parameter and contains the identification of the column being edited.

The value returned by this notify message is ignored.

In embodiments using custom controls, a Microsoft COM object is employed to implement an interface named IQFCustomFilter. This interface interacts between the QuickFilter header control and the custom filter, as follows:

HRESULT IQFCustomFilter::Edit (HWND hwndParent, POINT, ptHit, HWND* phWnd)

When the user clicks in the filter area, ::Edit method is called, passing the relative X/Y (as a point). The method returns a HWND into the pointer provided. If the call returns S_FALSE or a failure then phWnd is assumed to be invalid. Otherwise, the window is displayed, allowing the user to edit the property.

HRESULT IQFCustomFilter::Render (HDC hDC, RECT rect, DWORD dwState)

This is called to display the filter in the filter bar. The ICustomFilter object is responsible for rendering a representation of the data it holds into the given HDC/rectangle.

HRESULT IQFCustomFilter::GetOperatorMenu (HMENU* phMenu)

HRESULT IQFCustomFilter::OperatorChosen (UINT uID) These map directly to the QFN_GETOPERATORMENU/QFN_SETOPERATOR notifications sent by the filter control to the parent. If the ICustomFilter object returns E_NOTIMPL from ICustomFilter::GetOperatorMenu the standard notification is issued. A QFN_OPERATORCHOSEN is always issued to allow the parent to store the operator ID. When returning the operator menu a HMENU is returned to the pointer specified. If this is NULL or the call returns S_FALSE then it is ignored.

QFM_DISMISSEDIT
    wParam=fRefresh
    lParam=0

When the custom filter editor has modified the state of the filter a QFM_DISMISSEDIT is sent to indicate completion. frefresh indicates whether the custom filter object should re-render itself into the filter bar.

As will be recognized by those skilled in the art, the functionality of the illustrated embodiment does not depend on the use of messages and notifications exactly like those detailed above; they are detailed simply as illustrative examples.

The Edit Control and Filter Timer

The flowchart of FIG. 13 shows the functioning of the edit control and filter timer used in the illustrated embodiment.

An edit control is launched (600), as described above, when the user clicks on a filter and the control sends a notification (QFN_BEGINFILTEREDIT) to begin editing the filter. The filter input batch is erased (602). The filter timer is then reset (604) to the value specified by the data provider. The edit control is placed over the filter clicked by the user. Once launched, the edit control waits for messages changing the duration of the filter timer (620) or ending the edit (630), waits for keyboard input (640), and maintains a filter timer (650).

If the edit control receives a message changing the filter timer (QFN_SETTIMEOUT) (620), the duration of the filter timer is changed as specified by the message, and the timer is reset (622).

If the edit control receives a message telling it to end the edit (QFN_ENDFILTEREDIT) (630), the edit control closes (632) and the filter displays the text string as last modified in the edit control.

If the edit control receives a keystroke (640), the filter timer is reset (642) to the level specified by the data provider (QFM_SETTIMEOUT). If the keystroke is <Enter> (670), the user has explicitly requested that the data provider initiate a filtering operation. If there are any batched filter changes, these changes are sent (680) to the data provider (QFN_CHANGE) before closing the edit control. If the keystroke is anything but <Enter>, the keystroke is added (674) to a batch file containing all of the filter changes made since the last batch of filter changes was sent to the data provider (QFN_CHANGE). The timer is reinitialized (676) and records the time elapsed since the last keystroke. The control then waits for the next input.

If the edit control receives neither a keystroke (640), timeout message (620), nor end edit signal (630), the filter timer is checked (650). If the filter timer has expired (i.e. the time elapsed since the user last input a keystroke is greater than or equal to the time set by the data provider), and the filter batch is nonempty, the control sends a filter change notification (QFN_CHANGE) (660) to the data provider with the batched filter changes as a parameter (680). The control then waits for the next input. If the user has not input any keystroke at all or has not input any keystroke since the last batch of filter changes was sent, the batch is empty, the elapsed time is zero, and the control waits for the next input.

As will be recognized by those skilled in the art, the precise ordering of steps in the flowchart of FIG. 13 can be altered in numerous ways without changing the functionality of the illustrated embodiment.

Web Implementation

Embodiments of the present invention find particular utility in winnowing results of internet-based searches. In such embodiments, the data provider is typically a remote computer linked to the user's computer over a communications link. Popular search engines that may serve as such remote computers include Excite, Lycos, HotBot and AltaVista.

In such embodiments, communications between the graphical query interface on the user's computer and the remote data provider cannot usually be effected by the Microsoft Windows APIs detailed above. Instead, such communication takes place by other means. If the system is implemented in Java or the like, Java notification events can be used to effect the communications. In other embodiments, HTTP communications can be used.

The data attributes by which internet objects may be filtered include date, size, domain, textual abstract, etc.

As in other web-based applications, the issue of communications latency should be dealt with. In a preferred embodiment, the time constant used by the timer (detailed above) is adaptively set in accordance with actual network latency (as measured by known techniques), as well as the current processing burden under which the data provider is laboring.

Using Java applets or the like, a control like that described above can be authored and incorporated onto Web pages, extending standardization of this interface from the user's own desktop to throughout the world wide web.

Having described the principles of our inventive work with reference to several illustrative embodiments, it should be apparent that the technology can be modified in arrangement and detail without departing from such principles.

For example, while the illustrated embodiment has made use of two distinct control structures to form the standard user interface (i.e. the QuickFilter header control—which knows nothing of the data set but knows only of filters, labels, pulldown menus, etc., and the listview display control, which simply presents the data set), in alternative embodiments, a unified structure can be employed.

Further, while the invention has been illustrated in the context of a graphical user interface, our inventive concepts are not so limited. For example, the foregoing principles can advantageously be employed in text-based interfaces (as are common, for example, in many mainframe systems).

Moreover, while the invention has been illustrated as employing a tabular, detailed description of each data object in the listview control, in other embodiments a simpler iconic view of data objects meeting the specified filter criteria can be presented.

Still further, while the detailed embodiments have employed filter fields for each of several attributes, in other embodiments, a single filter field can be used to search across several attributes. In one such embodiment, the header control has a general "Search for" field. Data entered in that field is matched against all attributes of the data objects. Any object having a match (regardless of which attribute has the match) is presented for display. Such a general "Search for" field can be in addition to the specific attribute fields illustrated, or can be used to their exclusion. Similarly, single fields can be used to search across subsets of all the attribute fields (e.g. title/abstract/author).

In view of the wide variety of possible embodiments to which the principles of our invention can be applied, it should be recognized that the detailed embodiments are illustrative only and should not be taken as limiting the scope of our invention. Rather, we claim as our invention all such variations as come within the scope and spirit of the following claims, and equivalents thereto.

We claim:

1. In a first computer system, a method for standardized filtering of data from an arbitrary data provider, the method comprising:

receiving a first set of data from the arbitrary data provider, said first set of data including a plurality of data objects and a plurality of attributes associated with the data objects, wherein the data objects are constituents of the data set, and wherein the attributes describe the data objects;

displaying the first set of data, together with a plurality of labels and a plurality of filter input areas for receiving from a user of the computer system filter input that is responsive to an attribute of the first set of data, wherein:

each of the plurality of labels describes an attribute of the first data set; and each of the plurality of filter input areas is associated with a different attribute of the first set of data; the method further including:

receiving, from the user, filter input into one or more of the plurality of filter input areas, wherein a first filter input area accepts filter input responsive to a first attribute associated with the first filter input area;

sending the filter input to the arbitrary data provider;

receiving from the arbitrary data provider a second set of data, wherein said second set of data is derived by filtering the first data set according to the first attribute with the filter input from the user for the first attribute; and displaying the second set of data with said plurality of labels and filter input areas.

2. The method of claim 1 which includes displaying said data sets, labels, and filter input areas, in a windowed control.

3. The method of claim 2 further including:

displaying a query user interface, wherein the control is displayed within the query user interface;

receiving query input from a user of the computer system, wherein the query input is used to sort the first data set prior to the displaying of the first data set.

4. The method of claim 1 wherein the first and second data sets are row/column tables of data objects, wherein each column represents one of said attributes and each row represents a single data object.

5. The method of claim 1 further including:

timing elapsed time since filter input was last provided to the data provider; and sending any new filter input to the data provider when said elapsed time exceeds a predefined threshold interval, or when a user explicitly initiates a sending step, whichever comes first.

6. The method of claim 5 further including receiving from the arbitrary data provider the predefined threshold interval, wherein the predefined threshold duration is set to balance user-responsiveness with time required for said arbitrary data provider to filter data.

7. The method of claim 1 in which at least one filter input area includes a text string, wherein the text string is displayed inside said filter input area, and wherein filter input is a change to the text string in one or more of the plurality of filter input areas.

8. The method of claim 1 which includes transferring filter instructions, and providing sets of data, in accordance with a predetermined applications programming interface.

9. The method of claim 8 wherein the applications programming interface includes functions for (a) setting a filter, (b) getting a filter, (c) showing/hiding all filters, (d) setting the parent to which notifications are sent, and (e) setting the duration of the filter timer; and includes function calls for (a) telling the arbitrary data provider that a filter has been changed, (b) requesting that the arbitrary data provider return a pulldown menu, (c) telling the arbitrary data provider that an operator was chosen, and (d) telling a parent that a filter has started or finished being edited.

10. The method of claim 1 wherein the arbitrary data provider is located in the memory or storage of the first computer system.

11. The method of claim 1 wherein the arbitrary data provider is located in the memory or storage of a second computer system, said second computer system being in communication with the first computer system.

12. In a computer system, a method for displaying on a display device a control window area used to filter data in a first data set, the method comprising:

receiving from an arbitrary data provider a first data set, wherein the first data set includes a plurality of data objects and a plurality of attributes associated with the data objects;

displaying the first data set in the control window area, together with a plurality of labels, a plurality of pulldown menu buttons, and a plurality of filters, wherein: each label describes an attribute of the first data set, each label is associated with a pulldown menu button, each filter is associated with an attribute of the first data set, and at least one filter receives input used to modify the first data set according to the attribute with which said filter is associated;

in response to the actuation of a pulldown menu button next to a labeled attribute, displaying a pulldown menu whose contents are provided from the arbitrary data provider, wherein the arbitrary data provider supplies one or more attribute-specific filtering options displayed in the pulldown menu, whereby the arbitrary data provider elicits from a user of the computer system input responsive to the one or more attribute-specific filtering options for the labeled attribute;

receiving input from the user responsive to the pulldown menu;

sending said input to the arbitrary data provider;

receiving from the arbitrary data provider a second data set, wherein the second data set is derived by sorting the first data set according to the input; and displaying the second data set.

13. The method of claim 12 wherein at least one of said pulldown menus comprises a selection of comparison modes for the attribute with which the pulldown menu is associated.

14. The method of claim 12 wherein the contents of the pulldown menu include a custom control for the attribute with which the pulldown menu is associated.

15. The method of claim 12 wherein the pulldown menu launches a separate window.

16. The method of claim 12 wherein the contents of the pulldown menu include a unique value list for the attribute with which the pulldown menu is associated.

17. A computer storage medium having instructions thereon causing a computer programmed thereby to:

issue a filtering command to a data provider in response to user input;

receive responsive results from the data provider;

set a timer to a batch duration value that reflects a balance between visual display response speed and data provider response performance;

display the responsive results;

accept user input and store in a batch;

forward the batched user input to the data provider when the timer expires, or when the user explicitly instructs the batched input be forwarded, whichever occurs first;

receive modified results from the data provider; and display the modified results.

18. The storage medium of claim 17 in which said instructions cause the computer programmed thereby to reset the timer when the batched user input is forwarded to the data provider.

19. The storage medium of claim 17 in which said instructions cause the computer programmed thereby to reset the timer each time user input is accepted from the user.

20. The storage medium of claim 17 in which said instructions cause the computer programmed thereby to receive a timing parameter from the data provider, and to set said timer to the batch duration value in accordance with said parameter.

21. The storage medium of claim 17 in which said command comprises executable code sent over a communications link, for receipt by a remote computer on which the data provider resides.

22. The storage medium of claim 17 in which said command includes an API call.

23. The storage medium of claim 17 in which said instructions form part of a web browser.

24. A data filtering system comprising computer executable instructions stored on a storage medium, said instructions providing:

means to invoke a parent window, said parent window receiving a data set for display from an arbitrary data provider;

means to invoke a generic filtering control, said generic filtering control receiving into one or more filters user input for filtering the data set; and means for indirectly communicating between said generic filtering control and said arbitrary data provider through said parent window, said generic filtering control responding to messages that request performance of operations involving the one or more filters, said generic filtering control sending notifications describing user input events, said arbitrary data provider filtering the data set based upon the user input and according to a filtering technique selected by said arbitrary data provider.

25. In a method of querying a data provider, an improvement comprising:

presenting a query filter interface for facilitating filtering a data set according to a first attribute of the data set, the data set including a plurality of data objects and a plurality of attributes associated with the data objects, the first attribute including a plurality of selectable values capable of non-textual presentation to a user;

presenting a non-textual selector, said non-textual selector comprising a non-textual presentation of the plurality of selectable values for the first attribute, wherein presenting each of the plurality of selectable values occurs without presenting a textual depiction of the selectable value to the user; and issuing search criteria to the data provider in accordance with a value for the first attribute selected by the user through said selector;

wherein said selector is provided to the query filter interface by the data provider rather than being coded into the query filter interface.

26. The method of claim 25 in which presenting the non-textual selector includes graphically displaying a range of colors.

27. In a computer system having a user interface including a display and a user interface selection device, a method of formulating a query to a data provider and for presenting results of the query, comprising the steps:
 (a) identifying a set of data attributes corresponding to said data provider;
 (b) presenting labels for said attributes in first fields of the graphical user interface;
 (c) receiving from a user of the computer system, in second fields adjacent to said first fields, data entry responsive to one or more of said attributes, wherein each of said second fields corresponds to a different attribute;
 (d) querying the data provider to identify data objects having attributes matching said received data entry; and
 (e) presenting results of said query in the user interface, organized so that labels for attributes of the identified data objects are presented in association with the first fields associated therewith.

28. The method of claim 27 in which steps (a) through (d) are performed by a windowed header control, and step (e) is provided by a separate windowed display control.

29. The method of claim 27 in which:
 the first fields are arranged in a first row;
 the second fields are arranged in a second row beneath the first row; and
 data objects identified by said query are displayed in successive rows beneath the second row.

30. The method of claim 27 in which the identifying step includes obtaining said set of data attributes from the data provider, rather than from coding integral with said graphical user interface.

31. The method of claim 27 which includes issuing two or more query requests to the data provider as data entry is received in a single one of said second fields, the second of said requests being more detailed than the first.

32. A method of formulating a query to a data provider in a computer-based system, comprising:
 enumerating in a unique value list plural unique values of an attribute with which the unique value list is associated, wherein for at least one of the plural unique values plural data objects have the unique value;
 receiving first filter criteria from an interactive interface;
 receiving second filter criteria from said interactive interface;
 querying the data provider to identify data objects whose attributes match both said first and second filter criteria, wherein a logical ANDing of said first and second filter criteria is effected; and
 wherein at least the first of said filter criteria comprises a plurality of criteria selected from the unique value list, said plurality of selections being logically ORed together to form said first filter criteria.

33. In a computer system, a method for displaying on a display device a control window area used to filter data in a first data set, the method comprising:
 receiving from an arbitrary data provider a first data set, wherein the first data set includes a plurality of data objects and a plurality of attributes associated with the data objects;
 displaying the first data set in the control window area, together with a plurality of labels, and a plurality of pulldown menu buttons, wherein: each label describes an attribute of the first data set, and each label is associated with a pulldown menu button;
 in response to the actuation of a pulldown menu button associated with a labeled attribute, displaying a pulldown menu whose contents are provided from the arbitrary data provider, wherein the arbitrary data provider supplies one or more attribute-specific filtering options displayed in the pulldown menu, whereby the arbitrary data provider elicits from a user of the computer system input responsive to the one or more attribute-specific filtering options for the labeled attribute;
 receiving input from the user responsive to the pulldown menu;
 sending said input to the arbitrary data provider;
 receiving from the arbitrary data provider a second data set, wherein the second data set is derived by sorting the first data set according to the input; and
 displaying the second data set.

34. The method of claim 33 wherein at least one pulldown menu comprises a selection of comparison modes for the labeled attribute.

35. The method of claim 33 wherein the contents of the pulldown menu include a custom control for the labeled attribute.

36. The method of claim 33 wherein the contents of the pulldown menu include a unique value list for the labeled attribute.

37. In a computer system, a method for filtering visually displayed data, the method comprising:
 setting a timer to a batch duration value that reflects a balance between visual display response speed and data provider response performance;
 accepting user input and storing in a batch, the batched user input for a filtering command to a data provider;
 forwarding the batched user input to the data provider when the timer expires, or when the user explicitly instructs the batched user input be forwarded, whichever occurs first;
 receiving responsive results from the data provider; and
 displaying the responsive results.

38. The method claim 37 further comprising: resetting the timer when the batched user input is forwarded to the data provider.

39. The method of claim 37 further comprising: resetting the timer each time user input is accepted from a user.

40. The method of claim 37 further comprising:
 receiving a timing parameter from the data provider; and
 setting the timer to the batch duration value in accordance with said timing parameter.

41. In a computer system, a method for batching user input so as to balance visual display response speed and data provider response performance, the method comprising:
 setting a timer to a batch duration value that reflects a balance between visual display response speed and data provider response performance;
 accepting user input and storing in a batch, the batched user input for a filtering command to the data provider;
 receiving results from the data provider, the results responsive to the batched user input; and displaying the results.

42. A computer readable medium strong instructions for performing a method for batching user input so as to balance visual display response speed and operation response performance, the method comprising:

setting a timer to a batch duration value that reflects a balance between visual display response speed and operation response performance;

accepting user input and storing in a batch, the batched user input for a parameter for an operation;

sending a communication to an operation provider when the timer expires or when the user explicitly instructs the batched user input be forwarded, whichever occurs first;

receiving results from the operation provider, the results responsive to the batched user input; and displaying the results.

43. The computer readable medium 42 wherein the communication comprises a parameter change notification indicating availability of batched user input for retrieval by the operation provider.

44. The computer readable medium claim 42 wherein the communication comprises the batched user input.

45. The computer readable medium claim 42 further comprising:

resetting the timer when the communication is sent to the operation provider.

46. The computer readable medium claim 42 further comprising:

resetting the timer each time user input is accepted from a user.

47. The computer readable medium claim 42 further comprising:

receiving a timing parameter from the operation provider; and setting the timer to the batch duration value in accordance with said timing parameter.

48. A computer readable medium storing instructions for performing a method of presenting a custom control in a data filtering interface of a computer system, the method comprising:

presenting a data filtering interface that facilitates filtering a data set according to user input, the data set including a plurality of data objects, the data filtering interface providing a custom control area;

receiving custom control information from aprovider, the custom control information indicating appearance and behavior of a custom control within the custom control area; and presenting the custom control within the custom control area based upon the received custom control information, the custom control usable to enter user input for filtering the data set, wherein the provider specifies presentation of the custom control within the custom control area provided by the data filtering interface.

49. The computer readable medium of claim 48 in which presenting the custom control includes graphically displaying a range of colors.

50. A method of operating a generic filter control during filtering of a data set, the data set displayed in a window of a graphical user interface on a computer system, the method comprising:

invoking a generic filter control usable with any one of plural different types of data providers, wherein the generic filter control includes one or more filters, each filter operable to enter user input relating to filtering a data set provided by a data provider;

responding by the generic filter control to a request to perform an operation involving a value of one or more filters, the request originating from the data provider; and sending by the generic filter control a communication that describes a user input event, the communication sent for the data provider.

51. The method of claim 50 wherein the operation is getting the value.

52. The method of claim 50 wherein the operation is getting the value.

53. The method of claim 50 wherein the user input event is a change to a value of one or more filters.

* * * * *

UNITED STATES PATENT AND TRADEMARK OFFICE
CERTIFICATE OF CORRECTION

PATENT NO. : 6,279,016 B1
DATED : August 21, 2001
INVENTOR(S) : De Vorchik et al.

It is certified that error appears in the above-identified patent and that said Letters Patent is hereby corrected as shown below:

<u>Column 24,</u>
Line 3, replace "aprovider" with -- a provider --.
Line 36, replace "getting" with -- setting --.

Signed and Sealed this

Seventh Day of May, 2002

Attest:

JAMES E. ROGAN
Attesting Officer     *Director of the United States Patent and Trademark Office*

UNITED STATES PATENT AND TRADEMARK OFFICE
CERTIFICATE OF CORRECTION

PATENT NO.     : 6,279,016 B1
DATED          : August 21, 2001
INVENTOR(S)    : De Vorchik et al.

It is certified that error appears in the above-identified patent and that said Letters Patent is hereby corrected as shown below:

<u>Column 21,</u>
Lines 41-58, please delete claim 32.

Signed and Sealed this

Third Day of December, 2002

JAMES E. ROGAN
*Director of the United States Patent and Trademark Office*